US006648571B1

(12) United States Patent
Franzen et al.

(10) Patent No.: US 6,648,571 B1
(45) Date of Patent: Nov. 18, 2003

(54) MOBILE HANDLING APPARATUS FOR LOADING AND UNLOADING SHIPS IN DOCKS

(75) Inventors: Hermann Franzen, Mönchengladbach (DE); Dieter Klessinger, Düsseldorf (DE); Joachim Kröll, Jüchen (DE)

(73) Assignee: Atecs Mannesmann GmbH, Düsseldorf (DE)

(*) Notice: Subject to any disclaimer, the term of this patent is extended or adjusted under 35 U.S.C. 154(b) by 131 days.

(21) Appl. No.: 09/661,363

(22) Filed: Sep. 14, 2000

(30) Foreign Application Priority Data

Sep. 14, 1999 (DE) ........................................ 199 44 969

(51) Int. Cl.$^{7}$ ................................................ B65G 67/60
(52) U.S. Cl. ..................................... 414/141.4; 212/224
(58) Field of Search ................................ 212/224, 226, 212/302, 312, 344; 414/141.3, 141.4, 141.6, 142.8

(56) References Cited

U.S. PATENT DOCUMENTS

| | | | | | |
|---|---|---|---|---|---|
| 3,339,707 | A | * | 9/1967 | Ludwig | 414/141.4 X |
| 3,486,641 | A | * | 12/1969 | Zweitel et al. | 414/141.4 X |
| 3,722,705 | A | * | 3/1973 | Gould | 414/141.4 X |
| 3,958,106 | A | * | 5/1976 | Bedford et al. | 414/141.4 X |
| 4,200,162 | A | | 4/1980 | Tax | 180/23 |
| 5,232,327 | A | * | 8/1993 | Steckel | 414/141.4 |
| 5,435,410 | A | * | 7/1995 | Langston | 182/63 |

FOREIGN PATENT DOCUMENTS

| | | |
|---|---|---|
| DE | 1 950 885 | 4/1971 |
| DE | 2 149 732 | 4/1973 |
| DE | 102 984 | 1/1974 |
| DE | 29 08 584 | 9/1980 |
| DE | 296 06 717 U1 | 11/1996 |
| DE | 196 15 792 | 6/1997 |
| EP | 118 531 | 9/1984 |
| EP | 0 719 725 A2 | 7/1996 |
| GB | 1 284 330 | 8/1972 |

OTHER PUBLICATIONS

Article entitled "Pneumatische Fördereinrichtung mit Dosieranlage" published in magazine f+h report 83. Page 16.

* cited by examiner

*Primary Examiner*—Janice L. Krizek
(74) *Attorney, Agent, or Firm*—Cohen, Pontani, Lieberman & Pavane

(57) ABSTRACT

A mobile handling apparatus for loading and unloading ships in docks, the apparatus including portal supports, steerable traveling mechanisms arranged on the portal supports, an undercarriage freely movable on the traveling mechanisms, a harbor crane having a tower rigidly connected to the undercarriage, a luffing jib coupled to the tower, the luffing jib having an exchangeable device for picking-up a load, supporting girders mounted on the undercarriage so as to be horizontally moveable, the supporting girders each having a free end, vertical supporting pillars connected to the free ends of the supporting girders; and further traveling mechanisms arranged on the vertical supporting pillars so as to be raisable and lowerable.

14 Claims, 6 Drawing Sheets

MOBILE HANDLING APPARATUS FOR LOADING AND UNLOADING SHIPS IN DOCKS

BACKGROUND OF THE INVENTION

1. Field of the Invention

The invention relates to a mobile handling apparatus for loading and unloading ships in docks, in particular for combined container and bulk goods handling, using a luffing jib which is coupled to the tower of a harbor crane and has exchangeable load picking-up means.

2. Discussion of the Prior Art

In order to load ships with containers or bulk goods and to unload these from ships, in loading docks use is predominantly made of loading bridges which can be moved along the ship to be loaded or unloaded on rails placed on the quay. The loading bridges can only be placed at another location by means of a large outlay, for example by means of transfer devices or floating cranes, an outlay which is not only expensive, but also costs much valuable loading time.

SUMMARY OF THE INVENTION

Accordingly, it is an object of the present invention to provide a new type of handling apparatus for containers and bulk goods, which apparatus can be used in ports, is extremely mobile and can be used universally.

According to the invention, a handling apparatus similar to a mobile harbor crane is proposed, the tower of the harbor crane being connected, according to the invention, rigidly to a portal-like undercarriage which can be moved freely on preferably four steerable traveling mechanisms arranged on the portal supports. For the purpose of supporting the handling apparatus, supporting girders mounted so that they can be extended vertically are provided on the undercarriage on the side facing the load. The supporting girders bear, at their free ends, vertical supporting pillars on which rail or tracklaying traveling mechanisms which can be raised and lowered are arranged. Compared to a conventional mobile harbor crane, according to the invention the superstructure including the rotational mechanism, and also the double-sided support are omitted. Instead, the tower is connected rigidly to the portal-like undercarriage via a flange connection.

The luffing jib which is coupled to the tower can either be adjusted by means of a cable-operated luffing mechanism or by means of a hydraulic luffing mechanism. In order to dampen the luffing process in the region of the steep position of the jib in a controlled manner, a further feature of the invention makes provision for a prestressed, pressure-medium-operated spring-loaded element to be provided between the jib foot and the tower.

According to a further embodiment of the invention, the undercarriage is designed as a box-type girder mechanism which serves as a base for the drive assembly, the hoisting winches, the luffing mechanism and the electrical supply, as well as the fuel tanks. The undercarriage can be reached via ascents or descents. A crane cabin in the upper region of the tower enables the crane driver to have an optimum view of the freight and of the loading region. In addition, cameras in the jib tip can transmit the loading situation to a monitor within the cabin.

The portal-like undercarriage having four traveling mechanisms which have rubber tires and are arranged under the portal supports enables unlimited movement of the apparatus on the quay in every direction. The parallel movement of the handling apparatus with respect to the edge of the quay or water-side rail is monitored by a navigation system as is known from AGVs (automated guided vehicles).

Supporting girders which can be pushed out horizontally position, under sensor monitoring and electronic control, the rail traveling mechanisms of the supporting pillars to form a water-side rail into which the traveling mechanisms can be lowered. Operationally, the handling apparatus, oriented on the water-side rail, is moved, according to the invention, in the longitudinal direction of the quay or ship in a controlled manner. This simultaneously forms the support which faces the water on one side and together with the undercarriage chassis constitutes the supporting base of the handling apparatus. The rails which are in any case present in docks and on which the loading bridges are generally moved can be used, the present handling apparatus according to the invention only using the water-side rail into which the rail traveling mechanisms of the supporting pillars are lowered.

According to the invention, the traveling mechanisms which are provided on the portal supports and/or the supporting pillars are controlled in synchronism electronically and move the handling apparatus parallel to the quay.

Another feature of the invention makes provision for the undercarriage of the handling apparatus and also the supporting pillars to be dimensioned so that clearance areas for travelways are left between the extended supporting pillars and the portal supports and below the undercarriage. The clear height between the supporting pillars and portal supports is greater than the height of container transport vehicles and devices. The clearance area between the rail and the undercarriage traveling mechanisms creates space for at least two traffic lanes, for example for trucks, multi-trailer systems or AGVs. An additional travelway, for example for trucks, is provided between the portal supports of the undercarriage.

When there is an appropriately large overhead clearance below the portal-like undercarriage, it is possible, if required, also for reach stackers and forklifts to be used for the container transport transversely to the longitudinal access of the undercarriage. With an appropriate overhead clearance, the use of straddle carriers for the container transport is also ensured.

According to the invention, in order to transport the handling apparatus with the jib pivoted upward, the traveling mechanisms which are arranged on the supporting pillars are raised from the ground or from the rail, the supporting girders are retracted horizontally, so that the supporting pillars are positioned in the vicinity of the portal supports and the center of gravity of the handling apparatus is situated on the central axis of the apparatus. In this position, a change in location, for example the automatic movement from one quay to the other, can take place.

According to the invention, in order to handle bulk goods, the new type of handling apparatus can be fitted with a shorter jib and tower to form a grab crane. Another feature of the invention preferably makes provision, for the bulk goods handling, to select the clear height of the handling apparatus between the supporting pillars and portal supports so that there is room there for a supply or transfer bunker (hopper). In this case, the discharging conveyor belt mounted below the undercarriage conveys the bulk goods leaving the hopper to a conveyor belt running along the quay outside and next to the handling apparatus.

The handling apparatus proposed according to the invention is mobile and flexible in use. The costs for the purchase and maintenance can be calculated as being approximately 30–40% lower in comparison with conventional container and bulk goods loading bridges. The cost advantages put the operator of the handling apparatus into the position of being able to calculate competitive handling costs ($/Container or $/t bulk goods) and of being able to provide his services in a correspondingly more reasonable manner.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
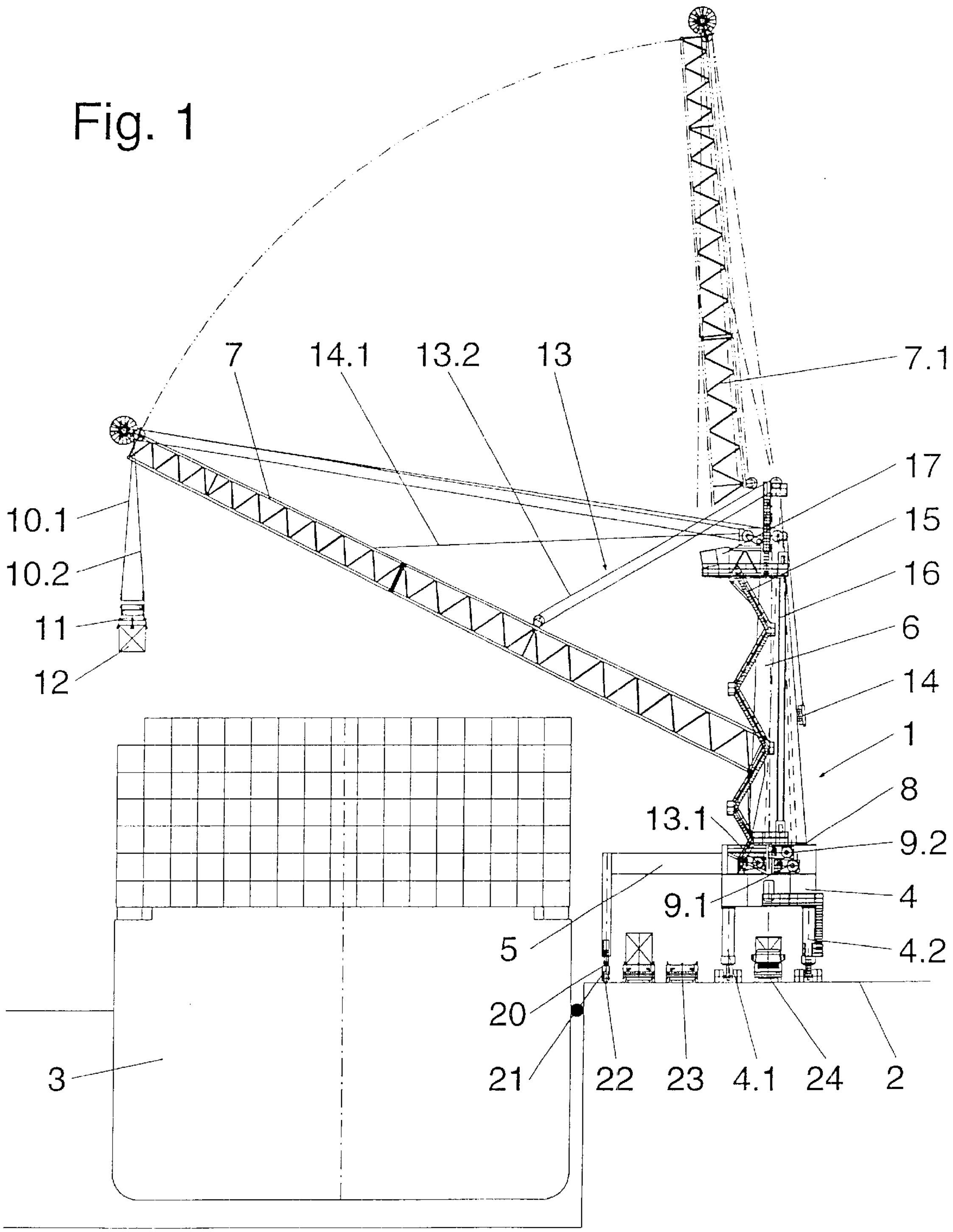
FIG. 1 shows a side view of the inventive handling apparatus during unloading of containers.

FIG. 1 illustrates the handling apparatus according to the invention in its operating position during the loading and unloading of containers. The drawing sketch shows the handling apparatus 1 in front of a container ship 3, situated at the quay 2, of the new generation (7000 to 8000 TEU Container loading capacity). The handling apparatus 1 consists essentially of an undercarriage 4 with a displaceable support 5, a tower 6 and a jib 7. The minimum range of swing of the jib 7 (which also corresponds to the transport position of the apparatus) is sketched by dash-dotted lines and indicated by 7.1.

The tower 6 and the undercarriage 4 are connected rigidly to each other via a flange. connection 8. Two hoisting winches 9.1 and 9.2 are arranged below the tower 6. In the example illustrated, the load picking-up means 11, which is fastened to hoisting cables 10.1 and 10.2, is designed as a spreader for picking up ISO containers and picks the load 12 up.

The jib 7 is adjusted by means of a cable-operated luffing mechanism 13 consisting of a luffing winch 13.1 and a block and pulley 13.2. A mobile counterweight 14, which is guided on the tower 6 and is connected to the jib 7 by two cables 14.1, compensates for part of the jib weight and thus reduces the driving power required for the luffing means. A cabin 17 can be reached via the step ascent 15 or the elevator 16 on the outside of the tower 6.

Figure 2:
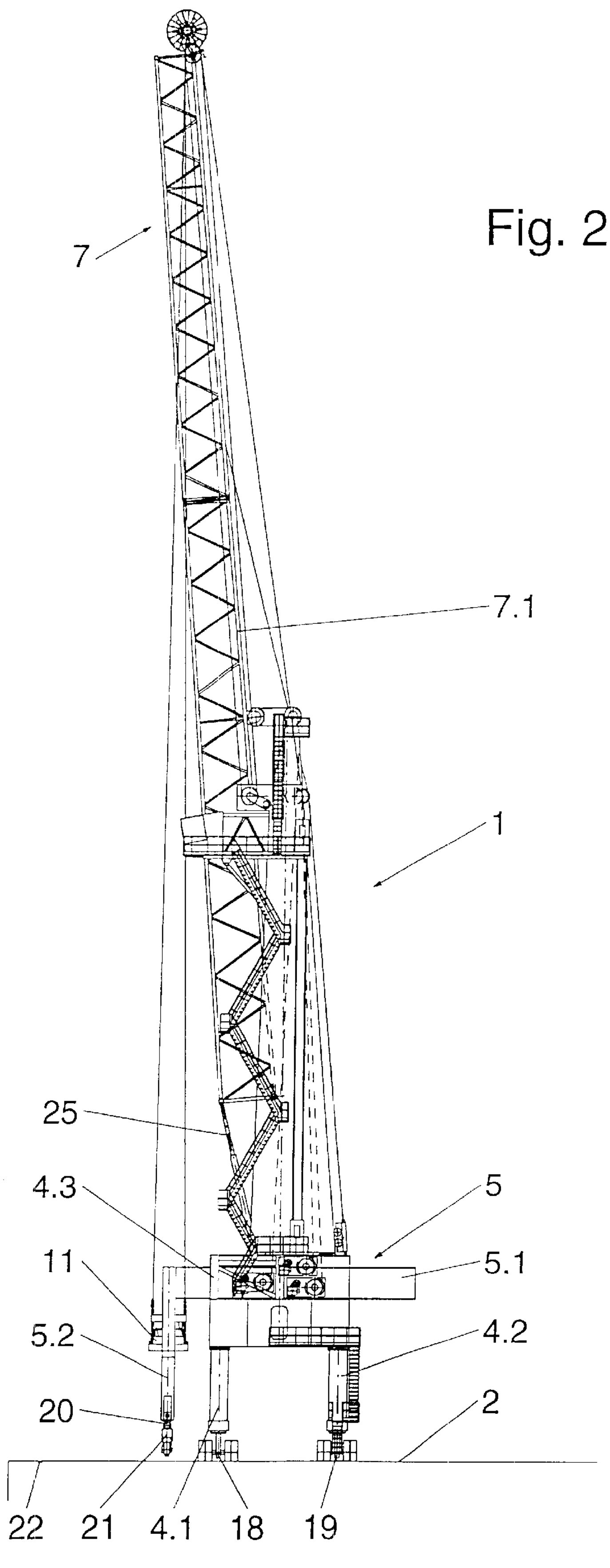
FIG. 2 shows the side view of the handling apparatus in the transportation position.

As can be seen from FIG. 2, four rigidly mounted portal supports 4.1 and 4.2 having traveling mechanisms 18 and 19 are provided on the undercarriage 4. The supporting girders 5.1 are mounted in a horizontally movable manner in the supporting box 4.3 of the undercarriage 4, the vertical supporting pillars 5.2 of the displaceable support 5 being arranged at the free ends of the supporting girders 5.1. A rail traveling mechanism 21 is mounted at the lower end of each supporting pillar 5.2, on a supporting cylinder 20, in a manner such that it can be raised and lowered. The rail traveling mechanism 21 is supported on a crane rail 22 placed on the water side of the quay 2. Traffic lanes, for example for AGVs 23 and trucks 24, are provided in the longitudinal direction of the quay 2. FIG. 2 shows the transport position of the handling apparatus 1. For this purpose, the jib is pivoted into its steepest position and the displaceable support 5 is retracted into its transport position. The rail traveling mechanism 21 is raised up by retracting the hydraulic cylinder 20 and is no longer in contact with the rail 22. The center of gravity of the handling apparatus 1 is now situated in the region of the central axis of the apparatus. The load picking-up means 11 is fixed in the region of the support 5. The handling apparatus 1 prepared in this manner can now be moved freely on the quay 2 to another location of use on the traveling mechanisms 18, 19 which are provided with rubber tires.

Figure 3:
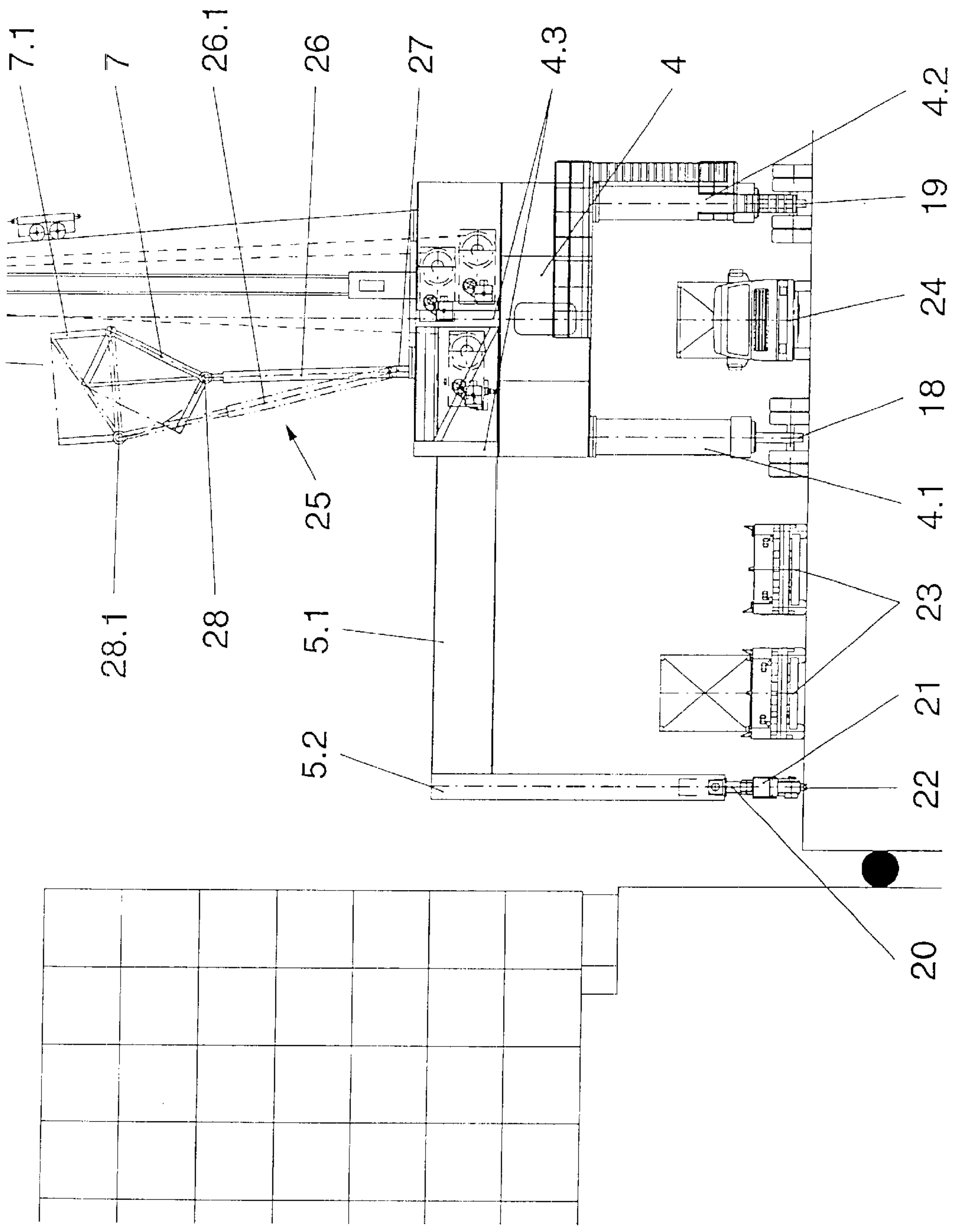
FIG. 3 shows a detail view from FIG. 1.

Analogously to the maximum range of swing of the jib 7, which is illustrated in FIG. 1, and the minimum configuration 7.1, the clamping length of a spring-loaded element 25 changes from its minimum length 26 to its maximum length 26.1. The spring-loaded element 25 is arranged between the bearing foot point 27 and corresponding position of the bearing head point 28 and 28.1 (FIG. 3).

Figure 4:
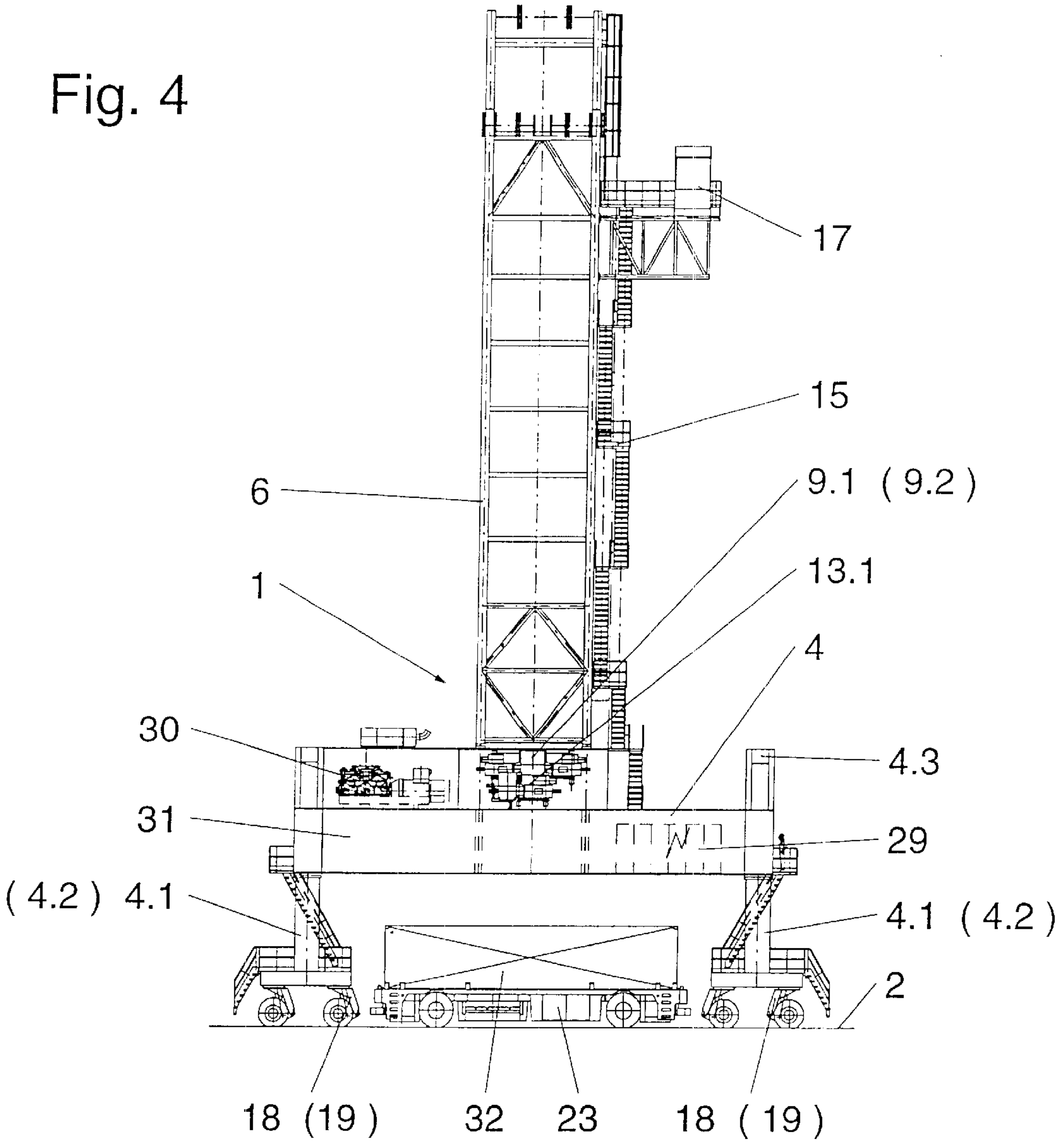
FIG. 4 shows the front view of the handling apparatus.

FIG. 4 shows the front view of the container handling apparatus 1 which is standing on the quay 2 by means of the portal supports 4.1 and 4.2, which are mounted rigidly on the undercarriage 4, and the traveling mechanisms 18 and 19. The undercarriage 4 serves as a base for the hoisting winches 9.1 and 9.2, the luffing winch 13.1, the electricity area 29, the drive assembly 30 and the fuel and hydraulic tank 31. Parallel to the tower 6, the step ascent 15 leads to the cabin 16. The figure of the drawing also illustrates an AGV 23 loaded with the freight 32 in the loading position with respect to the container handling apparatus 1.

Figure 5:
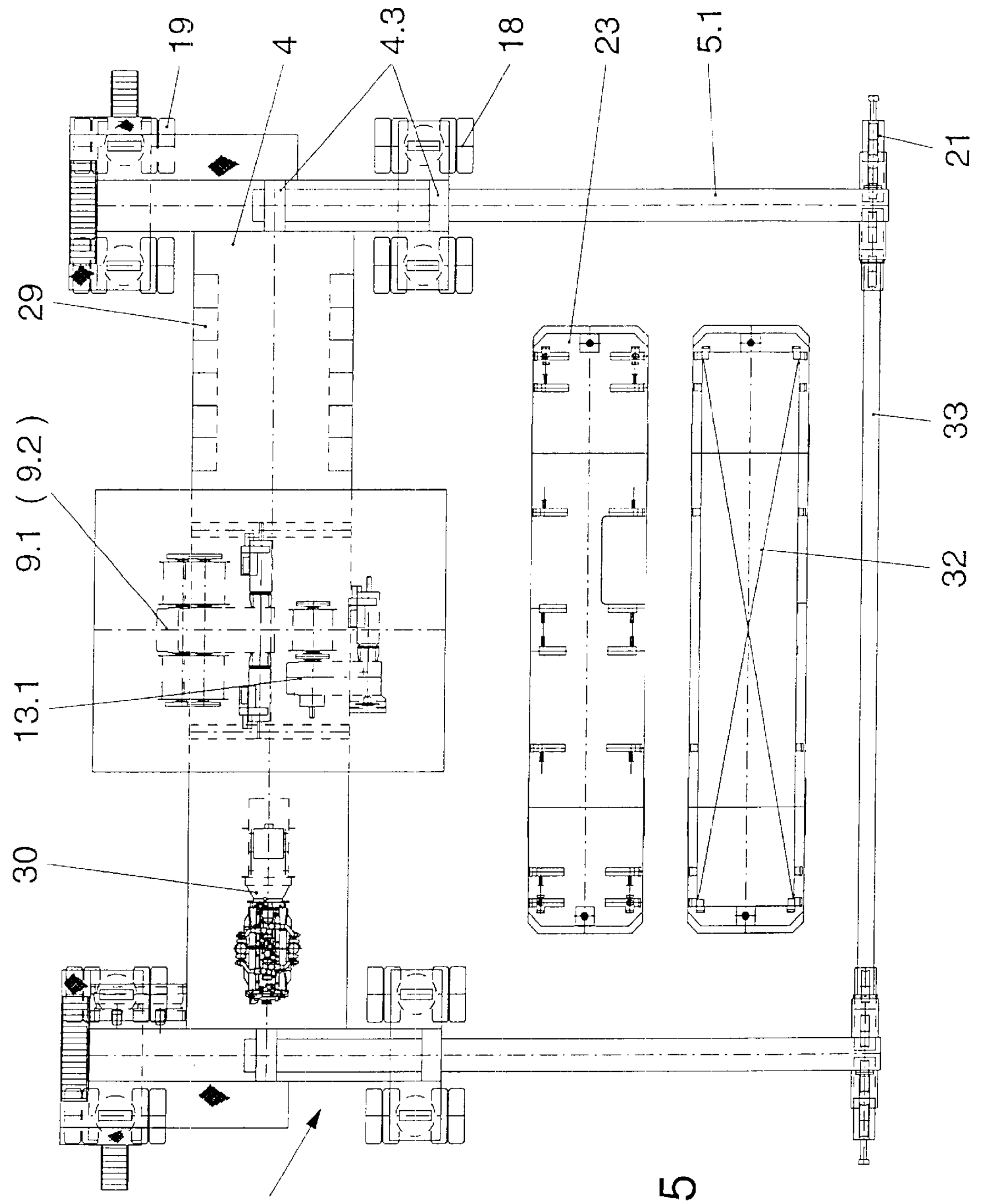
FIG. 5 shows the plan view of the undercarriage.

FIG. 5 illustrates the plan view of the handling apparatus 1 below the tower 6. The undercarriage 4 with the supporting box 4.3 and the supporting girder 5.1 can be seen. The hoisting winches 9.1 and 9.2, the luffing winch 13.1, the traveling mechanisms 18 and 19, the rail traveling mechanisms 21, the electricity area 29 and the drive assembly 30 are likewise illustrated. The supporting pillars 5.2 are connected to one another by means of the cross tying 33. In the clearance area below the undercarriage 4, between the supporting pillars 5.2 and the portal supports 4.1, an unloaded AGV and an AGV 23 loaded with the freight 32 can be seen.

Figure 6:
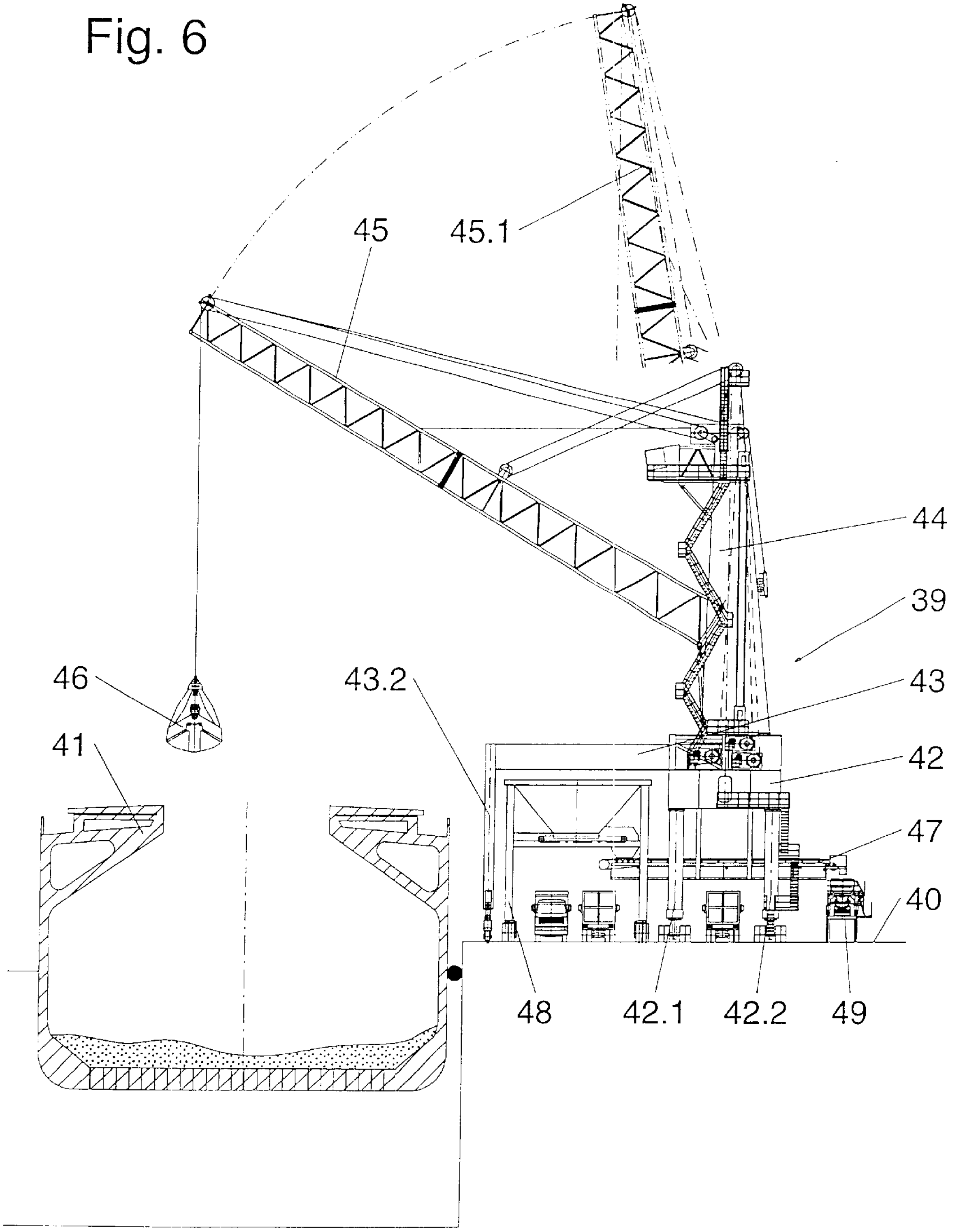
FIG. 6 shows the side view of the handling apparatus during the handling of bulk goods.

In the exemplary embodiments illustrated, the permissible overhead clearance on the undercarriage 4 is designed in such a manner that there is sufficient space for the various apparatuses for transporting and manipulating containers and/or bulk goods. By way of example, FIG. 6 illustrates a handling apparatus according to the invention for loading and unloading bulk goods. The handling apparatus is denoted by 39. The apparatus has been fitted with a shorter jib 45 and a shorter tower 44. The ship containing the bulk goods and situated at the quay 40 is denoted here by 41. Here too the handling apparatus 39 consists of the undercarriage 42, the support 43, the tower 44, the jib 45 and the load picking-up means 46 in the form of a grab. The minimum extent of utilization is indicated and illustrated by 45.1.

A discharging conveyor belt 47, which can be displaced for the construction phase and is mounted below the undercarriage 42 and between the rigidly mounted portal supports 42.1 and 42.2, conveys the bulk goods from a hopper 48 to, for example, 1 longitudinal conveyor belt 49 on the quay 40. The hopper 48 is placed between the supporting pillars 43.2 and the portal supports 42.1. During the construction phase the displaceable discharging conveyor belt 47 is situated in a position which does not adversely affect the clearance limit for the hopper 48. After the hopper 48 is aligned with respect to the bulk goods handling apparatus 39, the discharging conveyor belt 47 is pushed into the illustrated working position.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A mobile handling apparatus for loading and unloading ships in docks, comprising:

portal supports;

steerable traveling mechanisms arranged on the portal supports;

an undercarriage freely movable on the traveling mechanisms;

a tower rigidly connected to the undercarriage;

a luffing jib coupled to the tower, the luffing jib having exchangeable means for picking-up a load;

supporting girders mounted on the undercarriage so as to be horizontally moveable, the supporting girders each having a free end;

vertical supporting pillars connected to the free ends of the supporting girders; and further traveling mechanisms arranged on the vertical supporting pillars so as to be raisable and lowerable.

2. A mobile handling apparatus as defined in claim 1, wherein four steerable traveling mechanisms are provided.

3. A mobile handling apparatus as defined in claim 1, and further comprising a cable-operated luffing mechanism operatively connected to the luffing jib, which is coupled to the tower, so as to adjust the luffing jib.

4. A mobile handling apparatus as defined in claim 1, and further comprising a hydraulic luffing mechanism operatively connected to the luffing jib, which is coupled to the tower, so as to adjust the luffing jib.

5. A mobile handling apparatus as defined in claim 1, and further comprising a prestressed, pressure-medium-operated spring-loaded element provided between a foot of the jib and the tower.

6. A mobile handling apparatus as defined in claim 1, and further comprising a drive assembly, hoisting winches, a luffing mechanism, an electrical supply, and fuel tanks, the undercarriage being a box-type girder which serves as a base for the drive assembly, the hoisting winches, the luffing mechanism, the electrical supply, and the fuel tanks.

7. A mobile handling apparatus as defined in claim 1, and further comprising a navigation system operative to move the handling apparatus in a longitudinal direction of one of a quay and a ship in a controlled manner.

8. A mobile handling apparatus as defined in claim 1, wherein the supporting pillars are displaceable horizontally via the supporting girders so as to form a water-side rail.

9. A mobile handling apparatus as defined in claim 1, wherein at least one of the traveling mechanisms, which are provided on the portal supports, and the supporting pillars are electronically controlled in synchronism.

10. A mobile handling apparatus as defined in claim 1, wherein the undercarriage and the supporting pillars are dimensioned so that clearance areas for travelways are left between the supporting pillars and the portal supports and below the undercarriage, and a clear height between the supporting pillars and the portal supports corresponds to a height of container transport vehicles and devices.

11. A mobile handling apparatus as defined in claim 1, and further comprising a water-side rail into which the rail traveling mechanisms of the supporting pillars are lowerable so that the handling apparatus is movable in a longitudinal direction of one of a quay and a ship in a controlled manner.

12. A mobile handling apparatus as defined in claim 11, wherein the traveling mechanisms which are arranged on the supporting pillars are configured to be raisable from one of ground and the rail and the supporting girders are retractable horizontally so that the supporting pillars are positioned in a vicinity of the portal supports and a center of gravity of the handling apparatus is situated on a central axis of the apparatus, so that the handling apparatus is transportable with the jib pivoted upward.

13. A mobile handling apparatus as defined in claim 1, wherein the jib is a shortened jib and the tower is a shortened tower, the means for picking up a load including a grab for handling bulk goods.

14. A mobile handling apparatus as defined in claim 13, and further comprising a hopper, the supporting pillars and the portal supports being configured to have a clear height therebetween in which the hopper fits.

* * * * *

UNITED STATES PATENT AND TRADEMARK OFFICE

CERTIFICATE OF CORRECTION

PATENT NO. : 6,648,571 B1 Page 1 of 1
DATED : November 18, 2003
INVENTOR(S) : Hermann Franzen It is certified that error appears in the above-identified patent and that said Letters Patent is hereby corrected as shown below:

Title page,
Item [73], Assingee should read -- Gottwald Port Technology GmbH, --

Signed and Sealed this

Twelfth Day of October, 2004

JON W. DUDAS
*Director of the United States Patent and Trademark Office*